(12) United States Patent
Kato et al.

(10) Patent No.: US 11,774,340 B2
(45) Date of Patent: Oct. 3, 2023

(54) PARTICLE MEASURING DEVICE, CALIBRATION METHOD, AND MEASURING DEVICE

(71) Applicants: NATIONAL INSTITUTE OF ADVANCED INDUSTRIAL SCIENCE AND TECHNOLOGY, Tokyo (JP); RION Co., Ltd., Tokyo (JP); Kioxia Corporation, Tokyo (JP)

(72) Inventors: Haruhisa Kato, Ibaraki (JP); Yusuke Matsuura, Ibaraki (JP); Ayako Nakamura, Ibaraki (JP); Kaoru Kondo, Tokyo (JP); Takuya Tabuchi, Tokyo (JP); Hiroshi Tomita, Tokyo (JP); Hidekazu Hayashi, Tokyo (JP)

(73) Assignees: NATIONAL INSTITUTE OF ADVANCED INDUSTRIAL SCIENCE AND TECHNOLOGY, Tokyo (JP); RION Co., Ltd., Tokyo (JP); Kioxia Corporation, Tokyo (JP)

(*) Notice: Subject to any disclaimer, the term of this patent is extended or adjusted under 35 U.S.C. 154(b) by 382 days.

(21) Appl. No.: 17/276,847

(22) PCT Filed: Sep. 30, 2019

(86) PCT No.: PCT/JP2019/038490
§ 371 (c)(1),
(2) Date: Mar. 17, 2021

(87) PCT Pub. No.: WO2020/071306
PCT Pub. Date: Apr. 9, 2020

(65) Prior Publication Data
US 2021/0348999 A1 Nov. 11, 2021

(30) Foreign Application Priority Data
Oct. 4, 2018 (JP) .................................. 2018-188919

(51) Int. Cl.
*G01N 15/02* (2006.01)
*G06T 7/80* (2017.01)
(Continued)

(52) U.S. Cl.
CPC ............ *G01N 15/0227* (2013.01); *G06T 7/20* (2013.01); *G06T 7/60* (2013.01); *G06T 7/80* (2017.01); *G06T 2207/10016* (2013.01)

(58) Field of Classification Search
CPC ....... G01N 15/0227; G01N 2015/0687; G01N 15/06; G01N 2015/0053;
(Continued)

(56) References Cited

U.S. PATENT DOCUMENTS 9,857,283 B1 1/2018 Tatarkiewicz
10,126,226 B2 11/2018 Matayoshi et al.
(Continued)

FOREIGN PATENT DOCUMENTS

JP 2015-517677 A 6/2015
JP 2017-500549 A 1/2017
(Continued)

OTHER PUBLICATIONS

Taiwanese Office Action (TWOA) dated Dec. 23, 2022 for Taiwanese Patent Application No. 108135884; English machine translation.
(Continued)

*Primary Examiner* — Molly Wilburn
(74) *Attorney, Agent, or Firm* — Rankin, Hill & Clark LLP (57) ABSTRACT

For an easy calibration using calibration particles, provided is a measuring device to capture images of target objects. An image analyzer acquires multiple images obtained at a predetermined time interval, (a) specifies the mean-square displacement of a bright point of a calibration particle based (Continued)

on the displacement of the bright point of the calibration particle in the multiple images in a calibration mode, and (b) specifies the mean-square displacement of a bright point of the target particle based on the displacement of the bright point of the target particle in the multiple images in a measurement mode. A particle size analyzer (c) derives the particle size of the target particle from the mean-square displacement of the bright point of the target particle based on the mean-square displacement of the bright point of the calibration particle and the particle size of the calibration particle in an analysis mode.

8 Claims, 6 Drawing Sheets

(51) Int. Cl.
    *G06T 7/20*   (2017.01)
    *G06T 7/60*   (2017.01)
(58) Field of Classification Search
    CPC ... G01N 2015/0693; G01N 2015/1486; G01N 15/1429; G01N 2015/1493; G01N 15/1459; G01N 15/1463; G01N 15/1012; G01N 15/14; G06T 7/20; G06T 7/60; G06T 7/80; G06T 2207/10016; G06T 5/001
    See application file for complete search history.

(56) References Cited

U.S. PATENT DOCUMENTS

| | | | |
|---|---|---|---|
| 10,132,736 | B2 | 11/2018 | Matayoshi et al. |
| 2007/0229823 | A1* | 10/2007 | Sung ............... G01N 15/1463 356/336 |
| 2011/0043607 | A1* | 2/2011 | Grier .................. G01P 5/20 356/450 |
| 2012/0219985 | A1* | 8/2012 | Yoon ................ G01N 21/6458 977/894 |
| 2013/0316934 | A1 | 11/2013 | Matayoshi et al. |
| 2015/0226659 | A1 | 8/2015 | Matayoshi et al. |
| 2016/0290911 | A1 | 10/2016 | Hole et al. |
| 2018/0003610 | A1 | 1/2018 | Tatarkiewicz |
| 2018/0120214 | A1 | 5/2018 | Kato et al. |
| 2019/0170724 | A1* | 6/2019 | Balagurusamy ....... G06V 10/56 |
| 2020/0064169 | A1 | 2/2020 | Kato et al. |
| 2020/0124514 | A1 | 4/2020 | Kondo et al. |
| 2021/0065368 | A1* | 3/2021 | Tao ................... G06V 20/695 |

FOREIGN PATENT DOCUMENTS

| | | |
|---|---|---|
| WO | 2016/159131 A1 | 10/2016 |
| WO | 2018/105605 A1 | 6/2018 |
| WO | 2018/190162 A1 | 10/2018 |

OTHER PUBLICATIONS

International Search Report (ISR) dated Dec. 24, 2019 filed in PCT/JP2019/038490.

Matsuura et al., "Nanoparticle tracking velocimetry by observing light scattering from individual particles", Sensors and Actuators B256, Elsevier, 2018, pp. 1078-1085; Cited in Specification.

Matsuura et al., "Determination of Nanoparticle Size Using a Flow Particle-Tracking Method", Analytical Chemistry, 2018, 90, pp. 4182-4187; Cited in Specification.

Dragovic et al., "Sizing and phenotyping of cellular vesicles using Nanoparticle Tracking Analysis", Nanomedicine: Nanotechnology, Biology, and Medicine, Elsevier, 2011, vol. 7, pp. 780-788; Cited in ISR.

Van Der Pol et al., "Refractive Index Determination of Nanoparticles in Suspension Using Nanoparticle Tracking Analysis", NANO letters, American Chemical Society, 2014, vol. 14, No. 11, pp. 6195-6201; Cited in EESR.

Extended European Search Report (EESR) dated Jun. 8, 2022 for European Patent Application No. 19869892.0.

\* cited by examiner

HISTORY OF MOTION OF CALIBRATION PARTICLE

MOVEMENT AMOUNT DISTRIBUTION IN DISPERSION MEDIUM UPON CALIBRATION PARTICLE MEASUREMENT

HISTORY OF MOTION OF CALIBRATION PARTICLE AFTER CORRECTION

HISTORY OF MOTION OF TARGET PARTICLE

MOVEMENT AMOUNT DISTRIBUTION IN DISPERSION MEDIUM UPON TARGET PARTICLE MEASUREMENT

HISTORY OF MOTION OF TARGET PARTICLE AFTER CORRECTION

PARTICLE MEASURING DEVICE, CALIBRATION METHOD, AND MEASURING DEVICE

TECHNICAL FIELD

The present invention relates to a particle measuring device, a calibration method, and a measuring device.

BACKGROUND ART

As the technique of measuring the particle size of a particle in a dispersion medium, there is a particle tracking analysis (PTA) method in which the particle is irradiated with laser light for observation of a condensing point (hereinafter referred to as a bright point) of scattered light from the particle by an optical system and the particle size is calculated from Brownian motion of each particle according to a Stokes-Einstein expression.

In the PTA method, the center of gravity of the bright point is calculated for a series of images captured at a time interval $\Delta t$ by means of, e.g., a video camera, a particle Brownian motion track is acquired from a correspondence between bright points of adjacent frames, and a particle diffusion coefficient D is obtained from a two-dimensional mean-square displacement $\Delta_{MS}$ according to a relational expression ($\Delta_{MS}=4D\Delta t$). Next, the particle size d is calculated from the obtained diffusion coefficient D according to the Stokes-Einstein expression ($D=(k_B \cdot T)/(3\pi\eta d)$; $k_B$: a Boltzmann constant, $\eta$: a dispersion medium viscosity, $\pi$: a circumference ratio, T: an absolute temperature).

In a certain particle size measuring method, a flow velocity component in a flow field is subtracted from motion of the bright point in the PTA method regarding a particle in the flow field, and in this manner, motion of the bright point is corrected and the particle size is measured without influence of the flow field (see, e.g., Patent Literature 1).

On this point, the technique of measuring the flow velocity component used for such correction has been proposed (see, e.g., Nonpatent Literature 1). Further, a flow particle tracking (FPT) method has been proposed as the technique of measuring the particle size in a flow by means of the flow velocity measuring method (see, e.g., Nonpatent Literature 2).

CITATION LIST

Patent Literature

PATENT LITERATURE 1: WO 2016/159131 A

Nonpatent Literature

NONPATENT LITERATURE 1: Y Matsuura, A Nakamura, H Kato; Sensors and Actuators B 2561078-1085
NONPATENT LITERATURE 2: Y Matsuura, A Nakamura, H Kato; Analytical Chemistry 904182-4187

SUMMARY OF THE INVENTION

Problems to be Solved by the Invention

In the case of measuring the particle size by, e.g., the PTA method as described above, (a) the length of the mean-square displacement $\Delta_{MS}$ in terms of a physical unit and (b) the viscosity $\eta$ and the temperature T in the Stokes-Einstein expression are necessary. That is, the mean-square displacement $\Delta_{MS}$ on the images obtained by imaging is a value in terms of a pixel unit, and therefore, needs to be converted into the length in terms of the physical unit. The size of the pixel of an imaging element (or the pixel of the image) is taken as the "pixel unit" described herein, and a physical amount such as a meter is taken as the "physical unit."

Such a scale ratio (a correspondence between the physical unit and the pixel unit) can be measured in advance by, e.g., experiment, and the viscosity r and temperature T of the dispersion medium can be measured. However, various types of equipment are necessary. Moreover, it is difficult to measure the ambient temperature at the time of the microscope observation.

The present invention has been made in view of the above-described problems, and an object thereof is to provide a particle measuring device, a calibration method, and a measuring device, involving calibration of a measuring device configured to image a target object such as a target particle. The calibration is performed with a calibration particle (hereinafter referred to as a calibration particle), such as a standard particle, of which particle size is already acquired.

Solution to the Problems

The particle measuring device according to the present invention includes an image analyzer configured to acquire multiple images obtained at a predetermined time interval, (a) specify the mean-square displacement of a bright point of a calibration particle based on the displacement, in terms of a pixel unit, of the bright point of the calibration particle in the multiple images in a calibration mode, and (b) specify the mean-square displacement of a bright point of a target particle based on the displacement, in terms of a pixel unit, of the bright point of the target particle in the multiple images in a measuring mode, and a particle size analyzer configured to (c) derive the particle size of the target particle from the mean-square displacement of the bright point of the target particle based on the mean-square displacement of the bright point of the calibration particle and the particle size of the calibration particle in an analysis mode.

The calibration method according to the present invention includes (a) specifying, by the particle measuring device, the mean-square displacement of the bright point of the calibration particle based on the displacement, in terms of a pixel unit, of the bright point of the calibration particle in the multiple images obtained at the predetermined time interval, (b) specifying, by the particle measuring device, the mean-square displacement based on the displacement, in terms of a pixel unit, of the bright point of the target particle in the multiple images obtained at the predetermined time interval, and (c) calculating the particle size of the target particle from the mean-square displacement of the bright point of the target particle based on the mean-square displacement of the bright point of the calibration particle and the particle size of the calibration particle.

The measuring device according to the present invention (a) specifies, for the calibration particle in the dispersion medium of which viscosity is already acquired, the mean-square displacement, in terms of the pixel unit, of the bright point of the calibration particle based on the displacement, in terms of a pixel unit, of the bright point of the calibration particle in the multiple images obtained in such a manner that an image of the calibration particle in the dispersion medium is captured multiple times at the predetermined time interval by an imaging device, and (b) includes a scale calibrated according to a correspondence between the mean-square displacement, in terms of a physical unit, of the calibration particle derived according to a Stokes-Einstein expression and the mean-square displacement, in terms of a pixel unit, of the bright point of the calibration particle.

Effects of the Invention

According to the present invention, the particle measuring device, the calibration method, and the measuring device, involving calibration, with a calibration particle, of a measuring device configured to image the target object such as the target particle, are provided.

DESCRIPTION OF THE EMBODIMENTS

Hereinafter, embodiments of the present invention will be described based on the drawings.

First Embodiment

Figure 1:
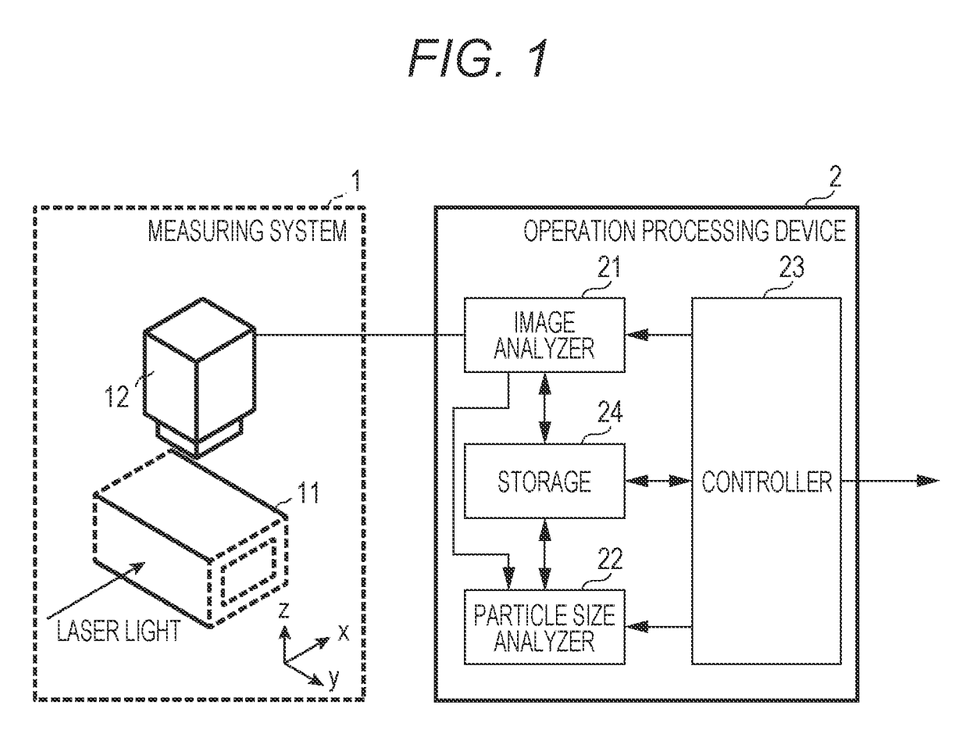
FIG. 1 illustrates a diagram of one example of a configuration of a particle measuring device according to a first embodiment of the present invention.

FIG. 1 illustrates a diagram of a configuration of a particle measuring device according to a first embodiment of the present invention. The particle measuring device according to the first embodiment measures the particle size of a target particle in a dispersion medium. As illustrated in FIG. 1, the particle measuring device according to the first embodiment includes a measuring system 1 and an operation processing device 2. The measuring system 1 includes an optical cell 11 and an imaging device 12. The optical cell 11 is an optically-transparent cell allowing accumulation or circulation of the dispersion medium. The optical cell 11 is a flow cell, for example. The imaging device 12 optically captures an image by an imaging element (a charge coupled device (CCD) such as a CMOS image sensor) via an optical system such as a lens, and outputs image data of the image in which pixels are two-dimensionally arrayed with a predetermined resolution. The imaging device 12 captures each image at a shutter speed (exposure time), and continuously generates multiple images at a predetermined time interval $\Delta t$. Note that the exposure time of each image is shorter than the time interval $\Delta t$. For example, in a case where a frame rate is 30 fps, the time interval $\Delta t$ is about 33 ms, and the exposure time is 30 ms.

The operation processing device 2 includes a built-in computer configured to execute a predetermined program, and executes predetermined data processing according to the program. The operation processing device 2 executes the processing according to the program, and operates as various processors accordingly. The operation processing device 2 described herein operates as an image analyzer 21, a particle size analyzer 22, and a controller 23. Further, the operation processing device 2 includes, as a storage 24, a non-volatile storage device (a flash memory, a hard drive and the like).

The image analyzer 21 controls the imaging device 12 such that the imaging device 12 captures an image of a predetermined area of the optical cell 11, thereby acquiring the image obtained by such imaging. Specifically, the image analyzer 21 acquires multiple images obtained at the time interval $\Delta t$ by the imaging device 12.

Further, the image analyzer 21 (a) specifies, for a calibration particle in the dispersion medium of which viscosity and temperature are not acquired, the mean-square displacement $\Delta_{MS\text{-}cal}$ of the calibration particle based on the displacement, in terms of a pixel unit, of a bright point of the calibration particle across frames, of which particle size $d_{cal}$ is clearly provided, in the multiple acquired images in the calibration mode, and (b) specifies, for the target particle, of which particle size d is unknown in the dispersion medium having the same temperature and substance as those in the calibration mode, the mean-square displacement $\Delta_{MS}$ of the target particle based on the displacement, in terms of the pixel unit, of a bright point of the target particle across the frames in the multiple acquired images in the measuring mode.

That is, the mean-square displacement $\Delta_{MS\text{-}cal}$ of the bright point of the calibration particle and the mean-square displacement $\Delta_{MS}$ of the bright point of the target particle do not need to be converted into a physical unit.

Figure 2:
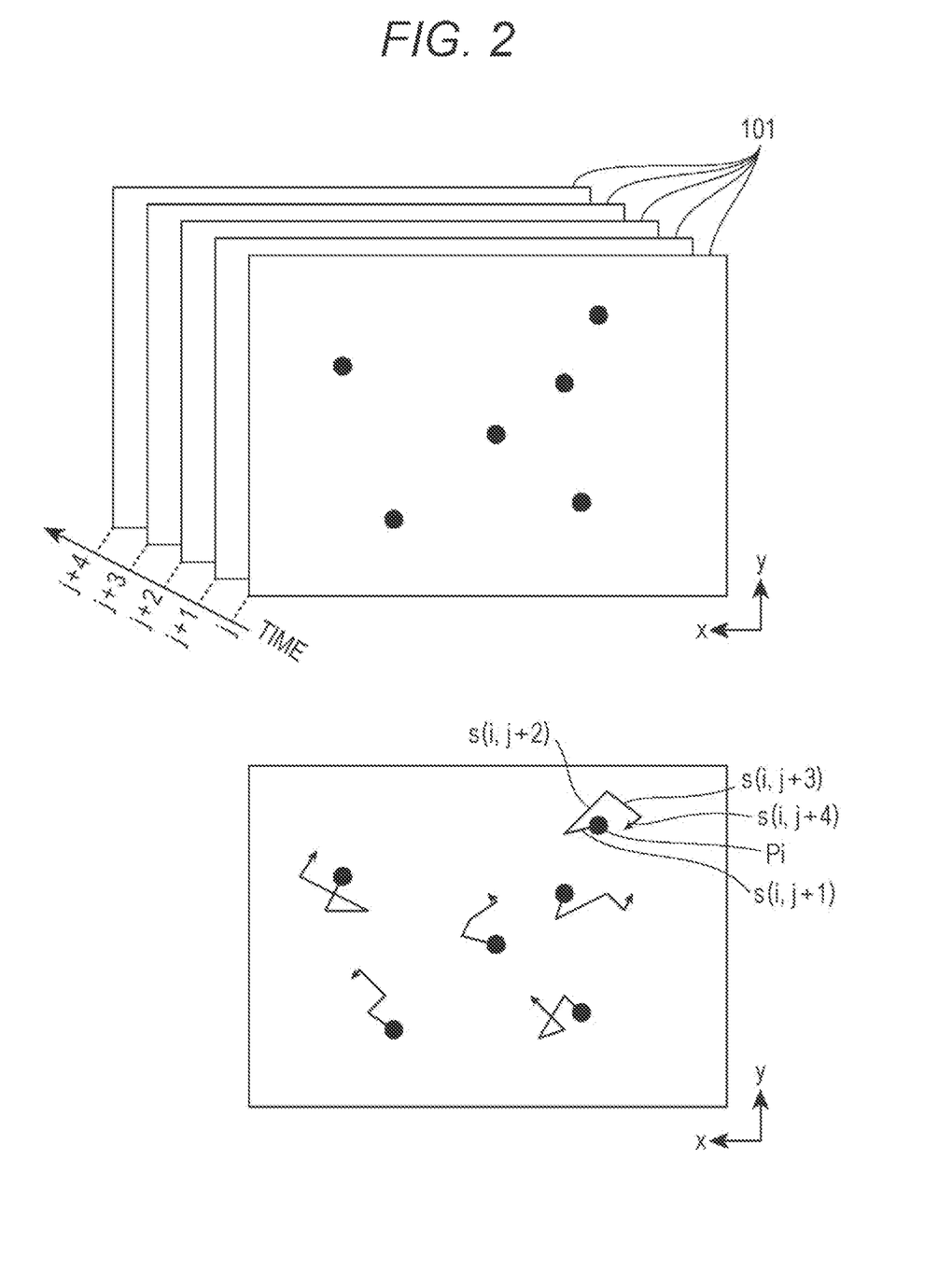
FIG. 2 illustrates views for describing a track of a bright point of a particle obtained in images of multiple frames.

FIG. 2 illustrates views for describing the track of the bright point of the particle obtained in the images of the multiple frames. As illustrated in FIG. 2, the displacement of a bright point of a particle Pi (the calibration particle or the target object) across the frames is obtained from images 101 at time points j, j+1, . . . , j+4, . . . , j+N. Specifically, the displacement s(i, j+1) of the bright point of the particle Pi from the time point j to the time point j+1 is obtained as a distance (the pixel unit) from the position of the bright point of the particle Pi in the image 101 at the time point j to the position of the bright point of the particle Pi in the image 101 at the time point j+1. Similarly, the displacements s(i, j+2), . . . , s(i, j+N) of the bright point of the particle Pi are obtained. Then, the mean square of these displacements is obtained as the mean-square displacement ($\Delta_{MS\text{-}cal}$ or $\Delta_{MS}$). Note that in the case of a large bright point of the particle, the position of the particle is obtained as the center of gravity of the bright point.

Specifically, the image analyzer 21 performs numbering i (i=1, 2, . . . , n) for the bright points of the multiple particles in each image, and for each of the particles Pi, . . . , Pn, stores positions (pixel coordinate values) in the multiple images in the storage 24 in association with each particle Pi. When the position of each particle Pi is obtained in a predetermined number of images, the image analyzer 21 reads the position of each particle Pi from the storage 24, and calculates the mean-square displacement ($\Delta_{MS\text{-}cal}$ or $\Delta_{MS}$) as described above.

Note that a representative value (an average value or a median value) of the mean-square displacements obtained from the same calibration particle group by observation of the multiple bright points is taken as the mean-square displacement $\Delta_{MS\text{-}cal}$ of the calibration particle. Moreover, in this embodiment, the unit of a length representing the above-described displacement is not necessarily the physical unit, but may be the pixel unit.

In the calibration mode, a predetermined region (a region within the angle of view of the imaging device 12, hereinafter referred to as an imaging region) of the dispersion medium in the optical cell 11 is irradiated with, e.g., laser light or white light, and the image analyzer 21 acquires the multiple images of the calibration particle in the dispersion medium. In the measuring mode, the imaging region of the dispersion medium in the optical cell 11 is irradiated with, e.g., laser light or white light, and the image analyzer 21 acquires the multiple images of the target particle in the dispersion medium. Irradiation light such as laser light or white light is not necessarily the same between the calibration mode and the measuring mode.

For example, the flow cell is used as the optical cell 11, the dispersion medium circulates in a y-axis direction in FIG. 1 and is irradiated with the laser light from an x-axis direction, and scattered light from the particle is received by the imaging device 12 from a z-axis direction. In this manner, the image of the particle is captured. Note that the flow velocity of the dispersion medium in this case is set according to, e.g., the length of the imaging region in the y-axis direction and the shutter speed.

Note that in a case where there is a flow field in the dispersion medium (i.e., in a case where the dispersion medium flows), flow velocity distribution of the dispersion medium in a region of the optical cell 11 corresponding to the angle of view of the imaging device 12 is specified in advance by a known method (e.g., the above-described technique of Patent Literature or fluid simulation). The image analyzer 21 (a) corrects the displacement of the calibration particle based on the flow velocity distribution of the dispersion medium to specify the mean-square displacement $\Delta_{MS\text{-}cal}$ of the calibration particle based on the corrected displacement in the calibration mode, and (b) corrects the displacement of the target particle based on the flow velocity distribution of the dispersion medium to specify the mean-square displacement $\Delta_{MS}$ of the target particle based on the corrected displacement in the measuring mode. Note that the flow velocity distribution in the calibration mode and the flow velocity distribution in the measuring mode may be the same as each other or different from each other. Calibration is performed in the flow field, and therefore, the number of samples is increased and accuracy is improved.

This flow velocity distribution may be constant (i.e., constant in a magnitude and a direction) in the imaging region, or may not be constant in the imaging region. In a case where the above-described flow velocity distribution is not constant in the imaging region, the flow velocity (the magnitude and the direction) at each of multiple positions in the image is specified in advance.

Figure 3:
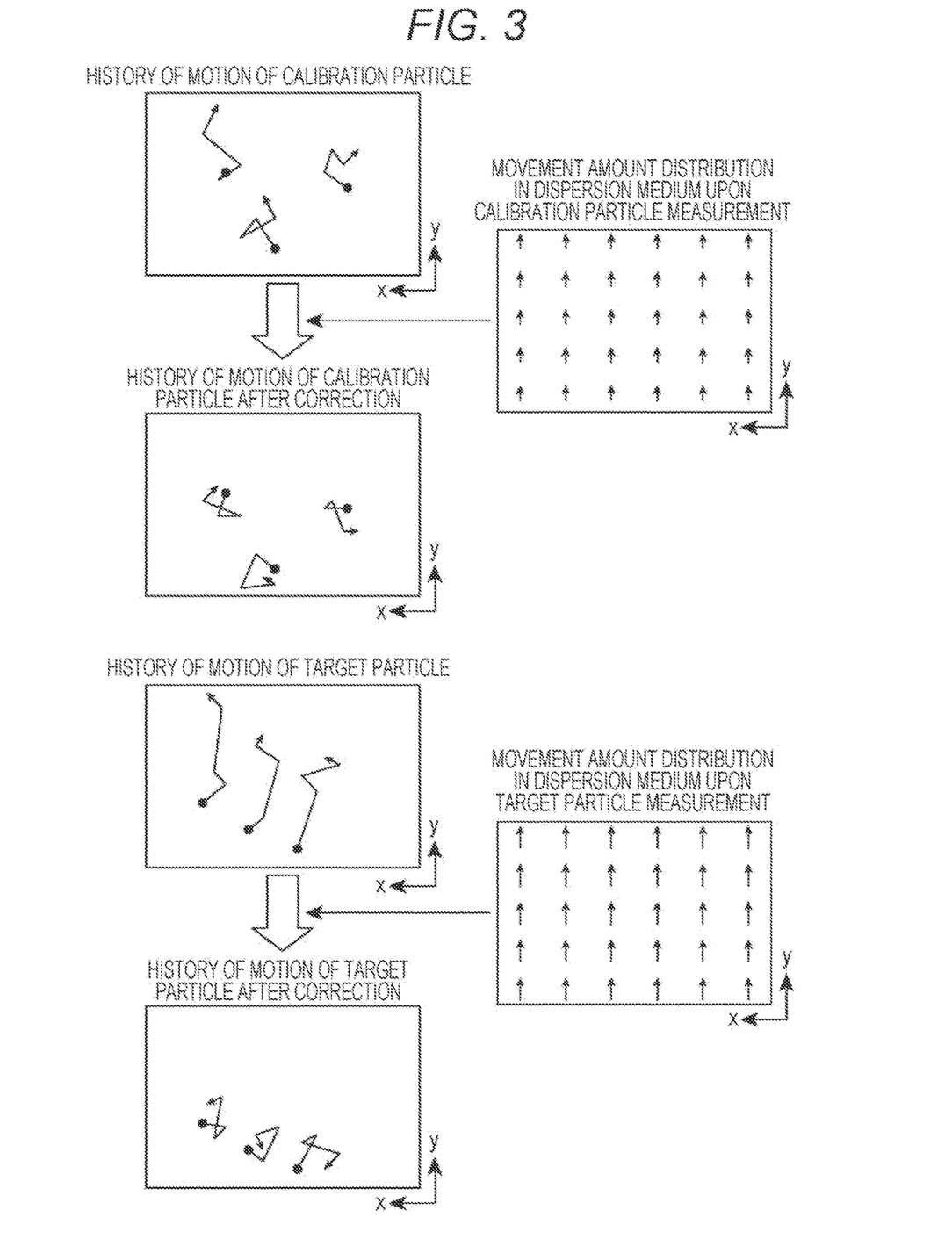
FIG. 3 illustrates views for describing correction of the displacement of the particle based on flow velocity distribution.

FIG. 3 illustrates views for describing correction of the displacement of the particle based on the flow velocity distribution. As illustrated in FIG. 3, the image analyzer 21 specifies the flow velocity at the position of the particle (the calibration particle or the target particle) based on the flow velocity distribution, specifies a distance (a distance in the x-direction and a distance in the y-direction) in each direction of movement at the flow velocity at the above-described time interval $\Delta t$, and subtracts the specified distance in each direction from the displacement in each direction to correct the displacement of the particle at the time interval $\Delta t$. The displacement of the particle is corrected based on the flow velocity distribution as described above, and in this manner, influence of the flow field of the dispersion medium is excluded and the displacement of the particle by Brownian motion is obtained.

(c) In the analysis mode, the particle size analyzer 22 derives the particle size d (the physical unit) of the target particle from the mean-square displacement $\Delta_{MS}$ of the target particle based on the mean-square displacement $\Delta_{MS\text{-}cal}$ of the calibration particle and the provided particle size $d_{cal}$ (a nominal value in terms of the physical unit or a measurement value obtained by other methods) of the calibration particle, and stores the particle size d in the storage 24. Note that the provided particle size $d_{cal}$ of the calibration particle is provided as a length in terms of the physical unit, and therefore, the particle size d of the target particle derived herein is similarly provided as a length in terms of the physical unit.

Specifically, from a relational expression between the above-described mean-square displacement $\Delta_{MS}$ and a diffusion coefficient D and a Stokes-Einstein expression, the product $\Delta_{MS} \times d$ of the mean-square displacement $\Delta_{MS}$ and the particle size d is $(4 \cdot k_B \cdot \Delta t \cdot T)/(3\pi \cdot \eta)$. If the temperature T and the viscosity $\eta$ are constant, the product $\Delta_{MS} \times d$ of the mean-square displacement $\Delta_{MS}$ and the particle size d is constant, and therefore, the particle size d of the target particle is derived from the following expression. In this case, $\Delta_{MS\text{-}cal}$ and $d_{cal}$ are provided in the calibration mode. In the measuring mode, $\Delta_{MS}$ of each target particle is measured, and in this manner, the particle size d of each target particle is obtained.

$$d = \Delta_{MS\text{-}cal} \times d_{cal} / \Delta_{MS}$$

In the calibration mode, the image analyzer 21 stores, in the storage 24, calibration data having the mean-square displacement $\Delta_{MS\text{-}cal}$ of the calibration particle or a value (e.g., a later-described device constant K) corresponding to the mean-square displacement $\Delta_{MS\text{-}cal}$ of the calibration particle. In the measuring mode, the particle size analyzer 22 reads the calibration data from the storage 24, and based on the calibration data, derives the particle size d of the target particle from the mean-square displacement $\Delta_{MS}$ of the target particle. That is, the calibration data is set in advance for the particle measuring device before measurement of the target particle. If the dispersion medium for calibration and the dispersion medium for measurement have the same substance, the temperature is managed so that the measuring mode can be executed many times without the calibration mode after the calibration mode has been executed once. Thus, after the calibration mode, the measuring mode may be promptly performed, or may not be promptly performed.

The calibration data having the particle size $d_{cal}$ of the calibration particle and the mean-square displacement $\Delta_{MS\text{-}cal}$ of the calibration particle or the value corresponding to the mean-square displacement $\Delta_{MS\text{-}cal}$ of the calibration particle is generated and is set for the particle measuring device (the storage 24) so that the mean-square displacement $\Delta_{MS}$ of the target particle can be specified in the measuring mode of the particle measuring device and the particle size d of the target particle can be derived from the mean-square displacement $\Delta_{MS}$ of the target particle based on the mean-square displacement $\Delta_{MS\text{-}cal}$ of the calibration particle and the particle size $d_{cal}$ of the calibration particle in the analysis mode. With this configuration, the particle measuring device is calibrated.

In the calibration mode, the image analyzer 21 may calculate, as the device constant K, the product ($\Delta_{MS\text{-}cal} \times d_{cal}$) of the above-described mean-square displacement $\Delta_{MS\text{-}cal}$ of the calibration particle and the provided particle size of the calibration particle. In the analysis mode, the particle size analyzer 22 may divide the device constant K by the mean-square displacement $\Delta_{MS}$ of the target particle to derive the particle size d of the target particle according to the following expression.

$$d = K/\Delta_{MS}$$

In this case, in the calibration mode, the device constant K may be stored as the calibration data in the storage 24. In the analysis mode, the device constant K may be read from the storage 24, and may be divided by the mean-square displacement $\Delta_{MS}$ of the target particle such that the particle size d of the target particle is derived.

Note that in a case where the particle size d of the target particle is not constant, the image analyzer 21 may derive the mean-square displacement $\Delta_{MS}$ for each target particle, and the particle size analyzer 22 may derive the particle size d for each target particle and may sort the derived particle size d into any of multiple predetermined particle size ranges to count the number of particles in each of the multiple predetermined particle size ranges. In this case, the particle size analyzer 22 stores a counting result (i.e., the number of particles in each particle size range) in the storage 24.

The image analyzer 21 may specify two-dimensional distribution of the device constant K at multiple positions in the image, and may derive the particle size d at the position of the target particle in the image based on the two-dimensional distribution of the device constant K. That is, the two-dimensional distribution of the device constant K at the multiple positions may be specified in advance in the calibration mode, and the device constant K at the position of the target particle in the image may be specified based on the two-dimensional distribution of the device constant K in the analysis mode. The image analyzer 21 may divide the image into multiple regions and may specify the mean-square displacement $\Delta_{MS-cal}$ of the calibration particle in each divided region, and the particle size analyzer 22 may derive the particle size d of the target particle based on the mean-square displacement $\Delta_{MS-cal}$ of the calibration particle in the divided region including the position of the target particle in the image. In this manner, even in a case where the optical magnification of the imaging device 12 varies according to a position in the imaging region, the particle size of the target particle at each position is accurately derived.

When the particle size d of the target particle is derived, the mean-square displacement $\Delta_{MS-cal}$ of the calibration particle or the device constant K at a position closest to the position of the target particle in the image may be used, or the mean-square displacement $\Delta_{MS-cal}$ or the device constant K at the position of the target particle in the image may be used as a position function from the mean-square displacement $\Delta_{MS-cal}$ of the calibration particle or the device constant K at a predetermined number of positions (multiple positions) close to the position of the target particle in the image.

The controller 23 sets an operation mode to any of the calibration mode, the measuring mode, and the analysis mode according to, e.g., user operation, and causes each processor (the image analyzer 21 and the particle size analyzer 22) to execute predetermined operation in each operation mode or outputs, e.g., the particle size or the counting result obtained by the particle size analyzer 22 to an external device. The measuring mode may be automatically switched to the analysis mode.

Note that in this embodiment, the temperature T of the dispersion medium is controlled to a predetermined value by a provided method in the calibration mode and the measuring mode.

Figure 4:
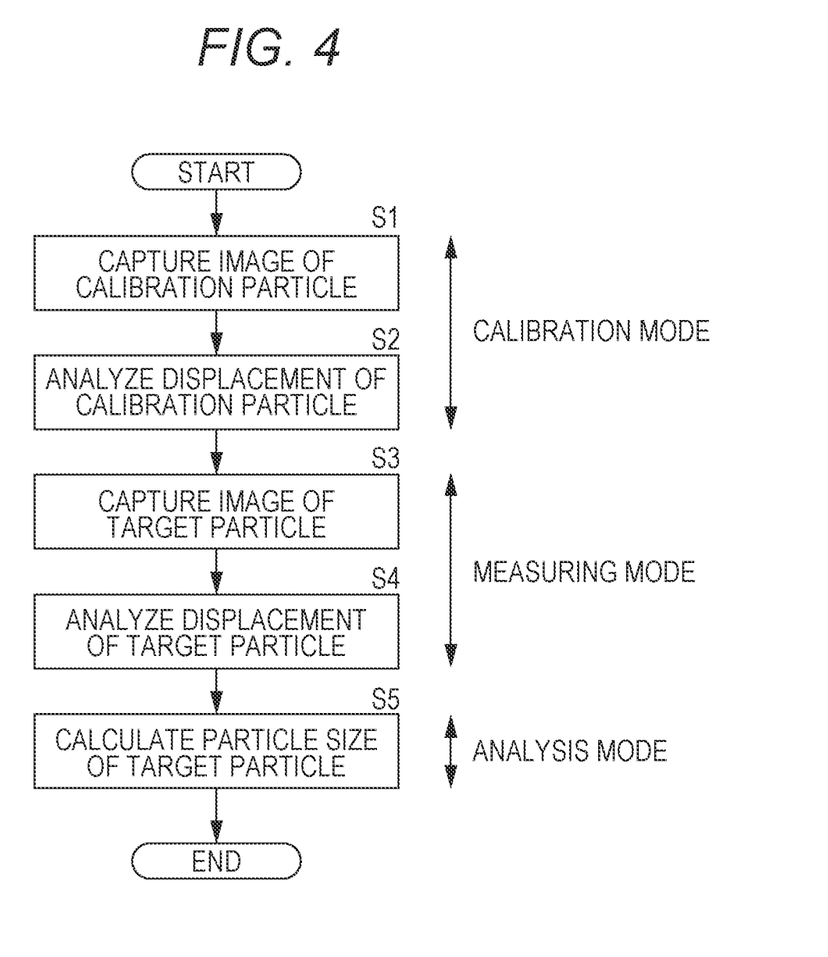
FIG. 4 illustrates a flowchart for describing operation of the particle measuring device according to the first embodiment.

Next, operation of the particle measuring device according to the first embodiment will be described. FIG. 4 illustrates a flowchart for describing operation of the particle measuring device according to the first embodiment.

First, for the calibration mode, the dispersion medium containing the calibration particle and having the unacquired viscosity η is accumulated or circulates in the optical cell 11. Then, when the calibration mode is specified by, e.g., user operation, the controller 23 causes the image analyzer 21 to execute the following operation in the calibration mode.

Brownian motion of the calibration particle occurs in the dispersion medium. The image analyzer 21 causes the imaging device 12 to capture the image of the bright point of the calibration particle in the dispersion medium a predetermined number of times at the time interval Δt, and acquires the predetermined number of images from the imaging device 12 (Step S1).

Next, the image analyzer 21 specifies the position of the bright point of the calibration particle in each image, and associates the calibration particle in the continuous images with each bright point of the calibration particle to specify the motion track of the bright point of each calibration particle. In a case where there is the flow field in the dispersion medium, the influence thereof is eliminated. Note that in the continuous images, the bright points having the shortest distance between the position in one image and the position in the other image are specified as the bright point of the same particle. Then, the image analyzer 21 calculates, in terms of the pixel unit, the mean-square displacement $\Delta_{MS-cal}$ at the time interval Δt based on such a motion track, and as the calibration data, stores a pair of the mean-square displacement $\Delta_{MS-cal}$ and the particle size $d_{cal}$ and the above-described device constant K in the storage 24 (Step S2).

In this manner, the calibration data including measurement conditions such as the dispersion medium and the temperature T thereof is specified in the calibration mode, and the particle measuring device is calibrated. The number of samples of the calibration particle can be more in the flow field.

Thereafter, the dispersion medium in the optical cell 11 is, for the measuring mode, changed to one including the target particle. As the material of the dispersion medium itself, the same medium as that used in the calibration mode is used. When the dispersion medium and the target particle are accumulated or circulate in the optical cell 11 and the measuring mode is specified by, e.g., user operation while the temperature T is controlled to a predetermined temperature T, the controller 23 causes the image analyzer 21 and the particle size analyzer 22 to execute the following operation in the measuring mode.

Brownian motion of the target particle occurs in the dispersion medium. The image analyzer 21 causes the imaging device 12 to capture the image of the bright point of the target particle in the dispersion medium a predetermined number of times at the time interval Δt, and acquires the predetermined number of images from the imaging device 12 (Step S3).

Next, the image analyzer 21 specifies the position of the bright point of the target particle in each image, and associates the target particle in the continuous images with each bright point of the target particle to specify the motion track of the bright point of each target particle as in the case of the calibration particle. Then, for each target particle, the image analyzer 21 calculates, in terms of the pixel unit, the mean-square displacement $\Delta_{MS}$ at the time interval Δt based on such a motion track (Step S4).

As described above, when the mean-square displacement $\Delta_{MS}$ of each target particle is specified, switching to the analysis mode is made, and the particle size analyzer 22 reads the above-described calibration data from the storage 24 to calculate the particle size d of each target particle from the mean-square displacement $\Delta_{MS}$ of each target particle based on the calibration data as described above (Step S5).

In this manner, in the analysis mode, the particle size d of the target particle is specified based on the calibration data. Note that after the measuring mode, the analysis mode may be specified by, e.g., user operation.

As described above, according to the first embodiment, the image analyzer 21 acquires the multiple images obtained at the time interval $\Delta t$, (a) specifies the mean-square displacement $\Delta_{MS\text{-}cal}$ of the calibration particle based on the displacement (the pixel unit) of the calibration particle in these multiple images, and (b) specifies the mean-square displacement $\Delta_{MS}$ of each target particle based on the displacement (the pixel unit) of each target particle in these multiple images in the measuring mode. Then, the particle size analyzer 22, (c) in the analysis mode, derives the particle size d of each target particle from the mean-square displacement $\Delta_{MS}$ of each target particle based on the mean-square displacement $\Delta_{MS\text{-}cal}$ of the calibration particle and the particle size $d_{cal}$ of the calibration particle.

With this configuration, the particle measuring device can be easily calibrated using the calibration particle. That is, when the viscosity $\eta$ and temperature T of the dispersion medium are the same between the calibration mode and the measuring mode, even if the viscosity $\eta$ of the dispersion medium is not acquired, the particle size of the target particle can be accurately measured without the need for converting the displacement obtained in terms of the pixel unit into the physical unit. In the case of the flow field, the target particle passes through the imaging region, and therefore, the particle size of the target particle can be sequentially newly measured and also a number concentration can be measured if the flow rate is acquired.

Second Embodiment

In the first embodiment, scale calibration between the length in terms of the pixel unit in the image and the length in terms of the physical unit (e.g., a meter in an SI unit system) is not essential, but can be performed using a similar calibration particle. In a second embodiment, scale calibration is, for a measuring device (e.g., an optical microscope) configured to capture an image of a target object by an imaging device to measure the target object, performed using a dispersion medium of which viscosity $\eta$ is acquired and a calibration particle of which particle size $d_{cal}$ is provided.

Figure 5:
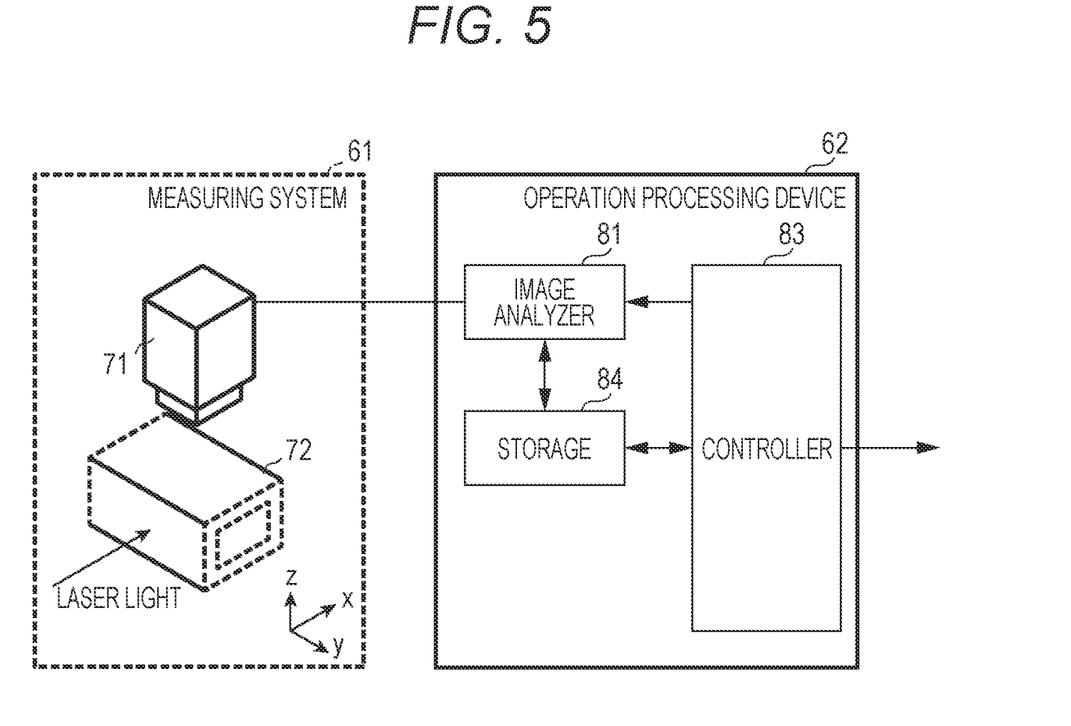
FIG. 5 illustrates a diagram of one example of a measuring device calibrated by a calibration method according to a second embodiment.

FIG. 5 illustrates a diagram of one example of the measuring device calibrated by a calibration method according to the second embodiment. The measuring device illustrated in FIG. 5 includes a measuring system 61 and an operation processing device 62. The measuring system 61 includes an imaging device 71. The imaging device 71 is a device similar to the above-described imaging device 12.

The operation processing device 62 is a device similar to the operation processing device 2. The operation processing device 62 operates as an image analyzer 81, a particle size analyzer 82, and a controller 83. Moreover, the operation processing device 62 includes, as a storage 84, a non-volatile storage device (a flash memory, a hard drive and the like).

The image analyzer 81 controls the imaging device 71 such that the imaging device 71 captures an image of a predetermined area, and acquires the image obtained by such imaging. In this embodiment, the image analyzer 81 acquires multiple images obtained at a time interval $\Delta t$ by the imaging device 71. The controller 83 causes each processor (the image analyzer 81) to execute processing such as measurement of the target object according to, e.g., user operation.

Note that the measuring device targeted for the calibration method according to the second embodiment may be, as described above, the optical microscope configured to observe the target object by means of the imaging device 71. Even for such an optical microscope, a scale ratio is used for conversion from a length (the number of pixels) in the image into an actual size in terms of a physical unit.

Figure 6:
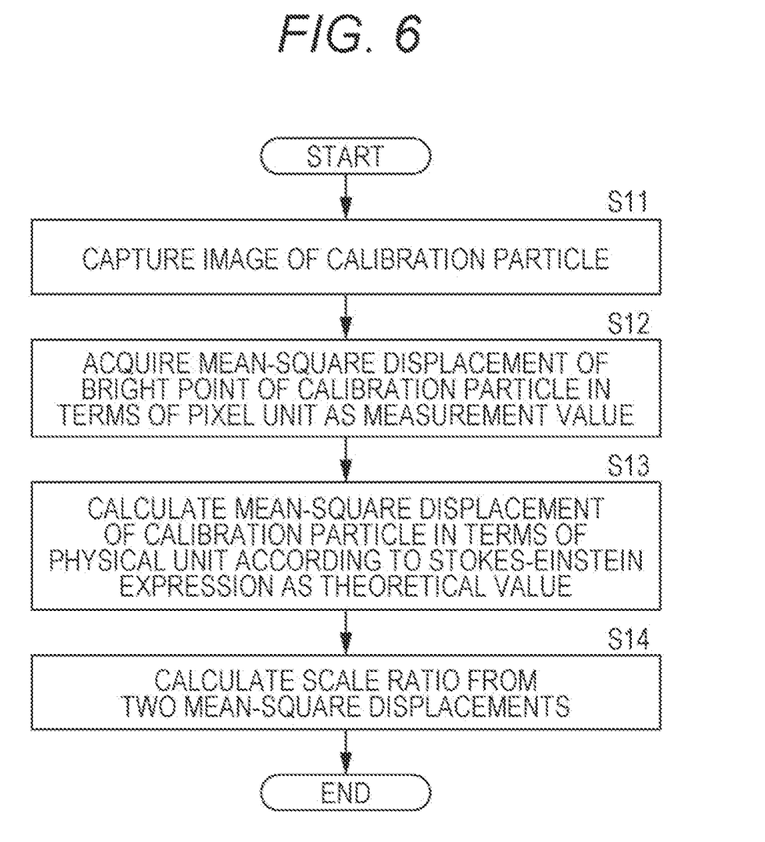
FIG. 6 illustrates a flowchart for describing the calibration method according to the second embodiment.

FIG. 6 illustrates a flowchart for describing the calibration method according to the second embodiment.

Upon calibration, an optical cell 72 is first arranged in an imaging area of the imaging device 71, and the dispersion medium containing the calibration particle and having the acquired viscosity is accumulated or circulates in the optical cell 72. The number of samples of the calibration particle can be more in a flow field. In this state, the image analyzer 81 acquires, as in the first embodiment, multiple images obtained in such a manner that an image of the calibration particle in the dispersion medium is captured multiple times at the time interval $\Delta t$ by the imaging device 71 (Step S11). As in the case of the first embodiment, based on the displacement of a bright point of the calibration particle in the multiple acquired images, the image analyzer 81 specifies, as a measurement value, the mean-square displacement $\Delta_{MS\text{-}cal1}$, in terms of a pixel unit, of the bright point of the calibration particle (Step S12).

Further, for the calibration particle in the dispersion medium, the image analyzer 81 derives, as a theoretical value, the mean-square displacement $\Delta_{MS\text{-}cal2}$, in terms of the physical unit, of the bright point of the calibration particle from, e.g., the provided particle size $d_{cal}$ (the physical unit) of the calibration particle and the viscosity $\eta$ and temperature T of the dispersion medium according to a Stokes-Einstein expression and a relational expression between the above-described mean-square displacement $\Delta_{MS\text{-}cal1}$ and a diffusion coefficient D (Step S13).

Next, the image analyzer 81 stores, as calibration data, a correspondence between the mean-square displacement $\Delta_{MS\text{-}cal2}$, in terms of the physical unit, of the calibration particle and the mean-square displacement $\Delta_{MS\text{-}cal1}$, in terms of the pixel unit, of the calibration particle (in this case, a ratio between them, i.e., the scale ratio) in the storage 84 of the measuring device (Step S14).

Thereafter, upon observation of the target object, a length (e.g., a displacement or a particle size) in terms of the pixel unit in the image is converted into a length in terms of the physical unit by means of the correspondence (the scale ratio).

As described above, according to the second embodiment, (a) the mean-square displacement $\Delta_{MS\text{-}cal1}$, in terms of the pixel unit, of the bright point of the calibration particle is specified based on the displacement (the pixel unit) of the bright point of the calibration particle in the multiple images obtained in such a manner that the image of the calibration particle in the dispersion medium is captured multiple times at the time interval $\Delta t$ by the imaging device, and (b) the scale ratio is set based on the correspondence between the mean-square displacement $\Delta_{MS\text{-}cal2}$ of the calibration particle calculated in terms of the physical unit according to the Stokes-Einstein expression and the mean-square displacement $\Delta_{MS\text{-}cal1}$, in terms of the pixel unit, of the calibration particle. Thus, the measuring device includes the scale calibrated according to the correspondence between the mean-square displacement $\Delta_{MS\text{-}cal2}$, in terms of the physical unit, of the calibration particle and the mean-square displacement $\Delta_{MS\text{-}cal1}$, in terms of the pixel unit, of the bright point of the calibration particle.

With this configuration, the scale is specified according to the mean-square displacement $\Delta_{MS\text{-}cal2}$, in terms of the physical unit, of the calibration particle and the mean-square displacement $\Delta_{MS\text{-}cal1}$, in terms of the pixel unit, of the bright point of the calibration particle, and therefore, scale calibration for the measuring device configured to capture the image of the target object is easily performed using the calibration particle.

Note that various changes and corrections in the above-described embodiments are obvious to those skilled in the art. These changes and corrections may be made without departing from the gist and scope of the subject matter and without degrading intended advantages. That is, these changes and corrections are included in the claims.

For example, in the first embodiment, the mean-square displacement $\Delta_{MS\text{-}cal}$ or the device constant K may be obtained as the function of the position (i.e., an x, y coordinate value) in the image in the calibration mode, and the mean-square displacement $\Delta_{MS\text{-}cal}$ or the device constant K at the position of the target particle may be obtained using the function in the measuring mode.

In the second embodiment, the time interval $\Delta t$ in the relational expression between the diffusion coefficient D and the mean-square displacement $\Delta_{MS\text{-}cal}$ may be taken as ($\Delta t - \tau/3$) to derive the mean-square displacement $\Delta_{MS\text{-}cal2}$, in terms of the physical unit, of the calibration particle, considering the exposure time t of the imaging device 12, 71 as a finite length.

INDUSTRIAL APPLICABILITY

The present invention is applicable to a measuring device configured to measure a particle size or calibration thereof, for example.

LIST OF THE REFERENCE NUMERALS

12, 71 Imaging device
21 Image analyzer
22 Particle size analyzer

The invention claimed is:

1. A particle measuring device for measuring a particle size of a target particle in a dispersion medium, comprising:
an image analyzer configured to acquire multiple images obtained at a predetermined time interval, (a) specify a mean-square displacement of a bright point of a calibration particle based on a displacement, in terms of a pixel unit, of the bright point of the calibration particle in the multiple images in a calibration mode, and (b) specify a mean-square displacement of a bright point of the target particle based on a displacement, in terms of a pixel unit, of the bright point of the target particle in the multiple images unit in a measuring mode; and
a particle size analyzer configured to (c) derive the particle size of the target particle from the mean-square displacement of the bright point of the target particle based on the mean-square displacement of the bright point of the calibration particle and a particle size of the calibration particle in an analysis mode.

2. The particle measuring device according to claim 1, wherein
the image analyzer (a) corrects the displacement of the bright point of the calibration particle based on flow velocity distribution of the dispersion medium to specify the mean-square displacement of the bright point of the calibration particle in the calibration mode, and (b) corrects the displacement of the bright point of the target particle based on the flow velocity distribution of the dispersion medium to specify the mean-square displacement of the bright point of the target particle in the measuring mode.

3. The particle measuring device according to claim 1, wherein
the particle size analyzer sorts the derived particle size into any of multiple predetermined particle size ranges to count the number of particles in each of the multiple predetermined particle size ranges.

4. The particle measuring device according to claim 1, wherein
the image analyzer acquires the multiple images obtained at the predetermined time interval, (a) specifies the mean-square displacement of the bright point of the calibration particle based on the displacement, in terms of the pixel unit, of the bright point of the calibration particle in the multiple images to calculate, as a device constant, a product of the mean-square displacement of the bright point of the calibration particle and a particle size of the calibration particle in the calibration mode, and (b) specifies the mean-square displacement of the target particle based on the displacement, in terms of the pixel unit, of the bright point of the target particle in the multiple images in the measuring mode, and
the particle size analyzer (c) derives the particle size of the target particle by dividing the device constant by the mean-square displacement of the bright point of the target particle in the analysis mode.

5. The particle measuring device according to claim 4, wherein
the image analyzer specifies the mean-square displacement of the bright point of the calibration particle at each of multiple positions in the images, and
the particle size analyzer derives the particle size at a position of the bright point of the target particle in the images based on two-dimensional distribution of the device constant at the multiple positions in the images.

6. A method for calibrating a particle measuring device for capturing an image of a target particle in a dispersion medium by an imaging device to measure a particle size of the target particle, comprising:
specifying, by the particle measuring device, a mean-square displacement of a bright point of a calibration particle based on a displacement, in terms of a pixel unit, of the bright point of the calibration particle in multiple images obtained at a predetermined time interval; and
enabling the particle measuring device, based on the mean-square displacement of the bright point of the calibration particle and on a particle size of the calibration particle, to calculate the particle size of the target particle from a mean-square displacement of a bright point of the target particle specified based on a displacement, in terms of the pixel unit, of the bright point of the target particle in the multiple images obtained at the predetermined time interval.

7. The calibration method according to claim 6, wherein the displacement of the bright point of the calibration particle is corrected based on flow velocity distribution of the dispersion medium, and the mean-square displacement of the bright point of the calibration particle is specified accordingly.

8. A measuring device for capturing an image of a target object by an imaging device to measure the target object,
a mean-square displacement, in terms of a physical unit, of a calibration particle of which viscosity is acquired in a dispersion medium being derived according to a Stokes-Einstein expression, and
a mean-square displacement, in terms of a pixel unit, of a bright point of the calibration particle being specified based on a displacement, in terms of the pixel unit, of the bright point of the calibration particle in multiple images obtained in such a manner that an image of the calibration particle in the dispersion medium is captured multiple times at a predetermined time interval by the imaging device, comprising:
a scale calibrated according to a correspondence between the mean-square displacement, in terms of the physical unit, of the calibration particle and the mean-square displacement, in terms of the pixel unit, of the bright point of the calibration particle.

* * * * *